US012645531B2

(12) United States Patent
    Uribe

(10) Patent No.:  US 12,645,531 B2
(45) Date of Patent:       Jun. 2, 2026

(54) DETECTING DATA BUS DRIVE FAULTS

(71) Applicant: Micron Technology, Inc., Boise, ID (US)

(72) Inventor: Melissa I. Uribe, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 33 days.

(21) Appl. No.: 18/904,612

(22) Filed: Oct. 2, 2024

(65) Prior Publication Data

US 2025/0028597 A1     Jan. 23, 2025

Related U.S. Application Data

(62) Division of application No. 17/880,220, filed on Aug. 3, 2022, now Pat. No. 12,130,702.

(60) Provisional application No. 63/234,470, filed on Aug. 18, 2021.

(51) Int. Cl.
    *G06F 11/10*          (2006.01)
(52) U.S. Cl.
    CPC ...... *G06F 11/1048* (2013.01); *G06F 11/1076* (2013.01)

(58) Field of Classification Search
    CPC ... G06F 11/1076; G06F 11/1048; G06F 11/10
    See application file for complete search history.

(56) References Cited

U.S. PATENT DOCUMENTS

| | | | |
|---|---|---|---|
| 10,224,072 B2 | 3/2019 | Dietrich | |
| 10,606,678 B2 | 3/2020 | Hsiong et al. | |
| 2018/0181465 A1* | 6/2018 | Choi | ..................... G06F 11/1048 |
| 2018/0196710 A1* | 7/2018 | Iyer | ......................... G06F 13/16 |
| 2020/0192749 A1* | 6/2020 | Richter | .............. G06F 11/1068 |
| 2022/0137863 A1 | 5/2022 | Schaefer | |
| 2022/0139487 A1 | 5/2022 | Schaefer et al. | |

* cited by examiner

*Primary Examiner* — Justin R Knapp
(74) *Attorney, Agent, or Firm* — Holland & Hart LLP

(57)                ABSTRACT

Methods, systems, and devices for memory operations are described. A pin associated with communicating error correction information may be biased, via a first circuit, to a first voltage level by a first voltage source that is coupled with the pin when the pin is in an idle state. Also, a set of data pins may be biased, via a second circuit, to a second voltage level by a second voltage source when the set of data pins is in the idle state. When a memory device misses a command transmitted from a host device, the voltage levels of the pin and set of data pins may remain at the respective voltage levels throughout a period during which the host device executes an operation associated with the missed command, indicating to the host device that data communicated by a corresponding data signal is invalid.

20 Claims, 7 Drawing Sheets

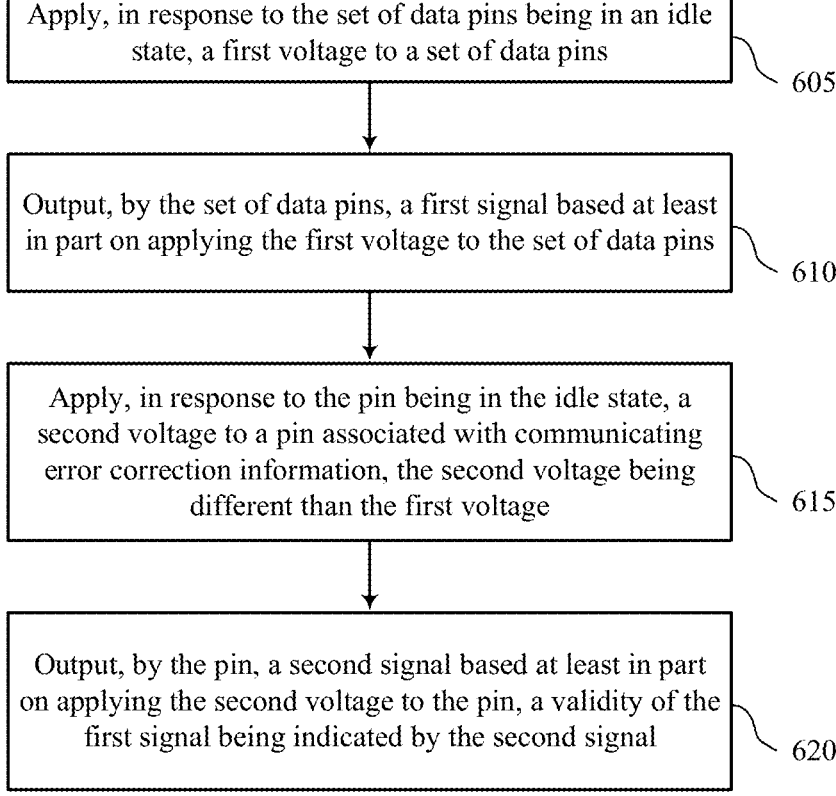

Apply, in response to the set of data pins being in an idle state, a first voltage to a set of data pins

605

Output, by the set of data pins, a first signal based at least in part on applying the first voltage to the set of data pins

610

Apply, in response to the pin being in the idle state, a second voltage to a pin associated with communicating error correction information, the second voltage being different than the first voltage

615

Output, by the pin, a second signal based at least in part on applying the second voltage to the pin, a validity of the first signal being indicated by the second signal

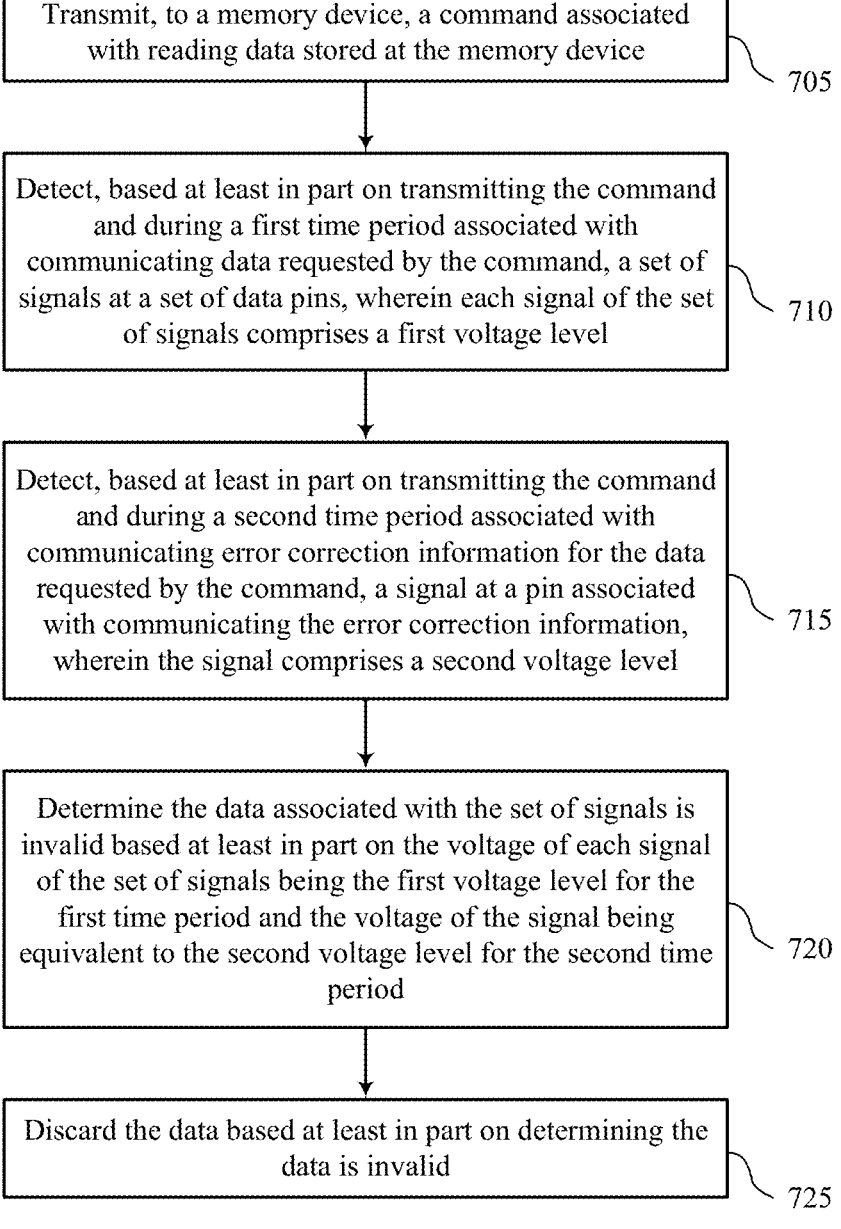

Transmit, to a memory device, a command associated with reading data stored at the memory device ⟋ 705

Detect, based at least in part on transmitting the command and during a first time period associated with communicating data requested by the command, a set of signals at a set of data pins, wherein each signal of the set of signals comprises a first voltage level ⟋ 710

Detect, based at least in part on transmitting the command and during a second time period associated with communicating error correction information for the data requested by the command, a signal at a pin associated with communicating the error correction information, wherein the signal comprises a second voltage level ⟋ 715

Determine the data associated with the set of signals is invalid based at least in part on the voltage of each signal of the set of signals being the first voltage level for the first time period and the voltage of the signal being equivalent to the second voltage level for the second time period ⟋ 720

Discard the data based at least in part on determining the data is invalid ⟋ 725

DETECTING DATA BUS DRIVE FAULTS

CROSS REFERENCE

The present application for patent is a divisional of U.S. patent application Ser. No. 17/880,220 by Uribe, entitled "DETECTING DATA BUS DRIVE FAULTS," filed Aug. 3, 2022, which claims the benefit of U.S. Patent Application No. 63/234,470 by Uribe, entitled "DETECTING DATA BUS DRIVE FAULTS," filed Aug. 18, 2021, each of which is assigned to the assignee hereof, and each of which is expressly incorporated by reference in its entirety herein.

FIELD OF TECHNOLOGY

The following relates generally to one or more systems for memory and more specifically to detecting data bus drive faults.

BACKGROUND

Memory devices are widely used to store information in various electronic devices such as computers, user devices, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

BRIEF DESCRIPTION OF THE DRAWINGS

FIGS. 6 and 7 show flowcharts illustrating a method or methods that support detecting data bus drive faults in accordance with examples as disclosed herein.

DETAILED DESCRIPTION

Figure 1:
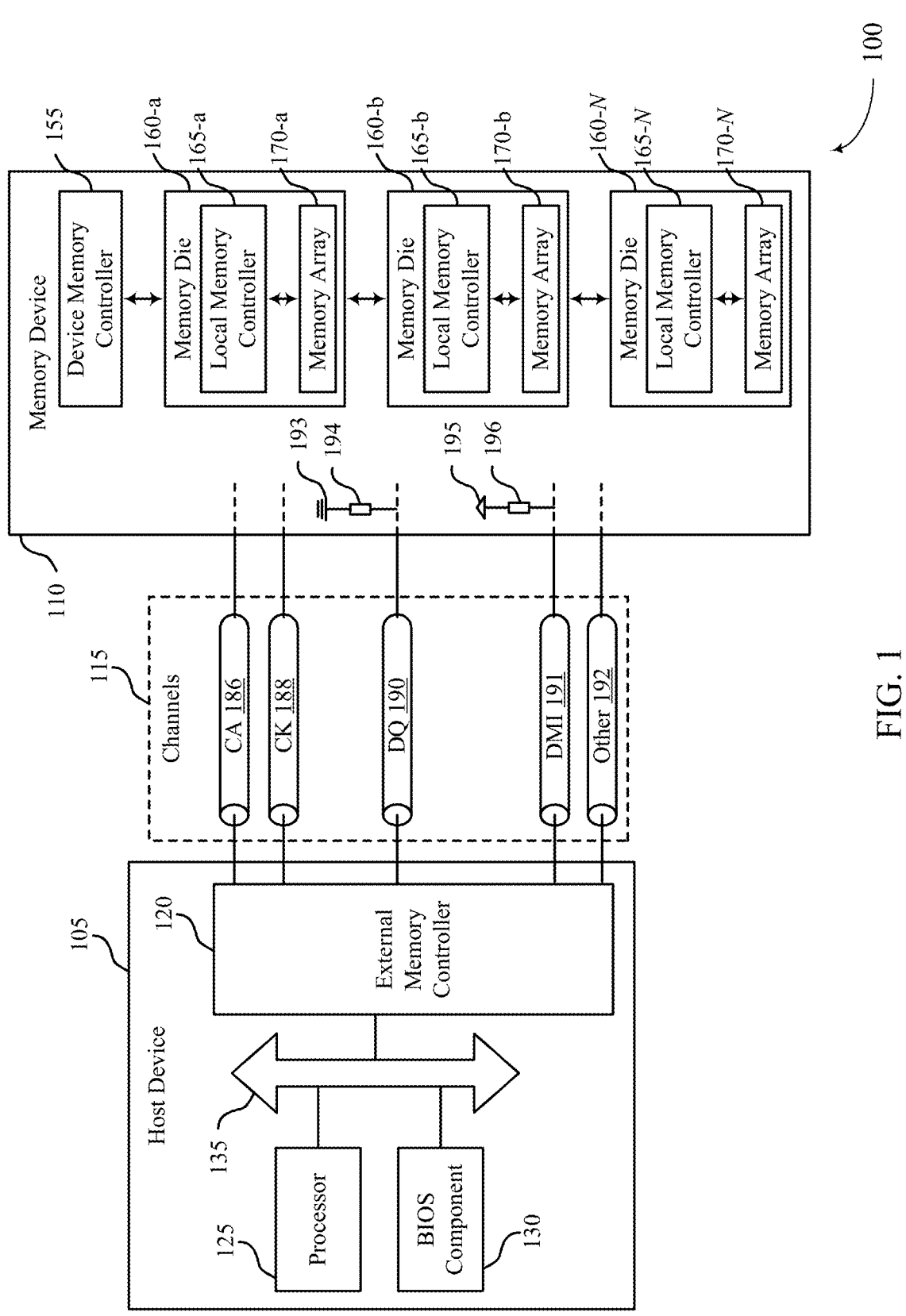
FIG. 1 illustrates an example of a system that supports detecting data bus drive faults in accordance with examples as disclosed herein.

A memory device may store data for a host device, which may access the stored data at a later time. In some examples, a failure may occur when data is communicated between the host device and the memory device. In some examples, a failure may occur when a host device treats invalid data received from (or determined as being received from) a memory device as valid data. An acceptable failure rate associated with storing and accessing the data stored at a memory device may be based on the consequences of a failure—for example, an acceptable failure rate of a system used in autonomous vehicles may be stricter than for other applications, such as desktop computing.

For safety applications, enhanced techniques may be used to decrease a failure rate associated with a memory device. Error management signaling may be communicated between a memory device and host device to reduce a quantity of failures. The error management signaling may include a valid operation signal (e.g., a valid read operation flag (VROF) signal), a syndrome check signal, a master error log signal, a link error correction code (ECC) signal, or any combination thereof. In some examples, a subset of available protocols for communicating data between a host device and memory device may support the communication of one or more of the supplemental error management signals.

A host device may use a protocol that does not support communicating one or more of the valid operation signal, the syndrome check signal, or the master error status signal—though, in some examples, the memory device may still generate the underlying data for the signals. Thus, a host device may be unable to exchange supplemental error management signaling with a memory device. For example, the host device may be unable to receive a valid operation signal, and thus, may be unable to determine whether a valid operation is being performed in a duration during which the operation is expected. Accordingly, communication errors between the memory device and host device may increase— e.g., if the host device uses invalid data obtained during a duration during which the operation was expected to be performed but was not. Thus, a failure rate associated with the memory device may also increase, and, in some cases, may exceed a threshold.

To support alternative measures for communicating of supplemental error management information between a memory device and a host device, enhanced signaling techniques for the supplemental management information may be used. In some examples, to indicate valid operations in real time, a pin associated with communicating error correction information (which may be referred to as an error management pin) may be biased, via a first circuit, to a first voltage level by a first voltage source that is coupled with the error management pin when the error management pin is in an idle state. Also, a set of data pins may be biased, via a second circuit, to a second voltage level by a second voltage source when the set of data pins is in the idle state. When a memory device misses a command transmitted from a host device, the voltage levels of the error management pin and set of data pins may remain at the respective voltage levels throughout a period during which the host device executes an operation associated with the missed command. For example, the voltage of the error management pin may remain at a high voltage level throughout a period for communicating an error management code (which may be referred to as a link ECC duration). In such cases, the voltage levels of the error management pin and the set of data pins may indicate to the host device that data communicated by a corresponding data signal is invalid.

By coupling the error management pin with a different voltage source than the data pins when the pins are in an idle state, information indicating whether a valid operation is occurring may be communicated to a host device. In some examples, a host device may use a received data signal and corresponding error management signal to perform an error management operation, where an error management code obtained from the error management signals may indicate that data obtained from the data signals is invalid when the pins are in an idle state.

Features of the disclosure are initially described in the context of systems and dies. Features of the disclosure are also described in the context of a signal diagram and process flow. These and other features of the disclosure are further illustrated by and described with reference to an apparatus diagram and flowcharts that relate to detecting data bus drive faults.

FIG. 1 illustrates an example of a system 100 that supports detecting data bus drive faults in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a secondary-type or dependent-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of the host device 105 may be coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general-purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 (e.g., memory die 160-a, memory die 160-b, memory die 160-N) may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies 160 may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165 or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of the system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, CA channels 186 may be operable to communicate commands between the host device 105 and the memory device 110 including control information associated with the commands (e.g., address information). For example, commands carried by the CA channel 186 may include a read command with an address of the desired data. In some examples, a CA channel 186 may include any quantity of signal paths to decode one or more of address or command data (e.g., eight or nine signal paths).

In some examples, CK channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, DQ channels 190 may be operable to communicate one or more of data or control information between the host device 105 and the memory device 110. For example, the DQ channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error management channels, which may be referred to as error control channels, error detection code (EDC) channels, or ECC channels. The error management channels may be operable to communicate error detection signals, such as checksums, to improve system reliability. An error management channel may include any quantity of signal paths.

A package may be used to contain and provide access to and from a memory device 110. The package may include pins that give access to and from components within the memory device 110 (e.g., a memory controller, such as a device memory controller 155 or a local memory controller 165, a memory die, such as a memory die 160). In some examples, the package may include DQ pins that allow data to be input to or output from the memory controller. Also, the package may include a write clock (WCK) pin that is used to receive a WCK signal from a host device 105—the WCK signal may be received when a read or write command is issued by the host device 105 and may be used for sampling a data signal received on the DQ pins at the memory device 110. Also, the package may include a read data strobe (RDQS) pin that is used to output a clock signal (which may also be referred to as an RDQS signal)—e.g., when the memory device 110 is configured to operate using a frequency that falls within a range of frequencies. In some examples, the memory device 110 generates the RDQS signal based on the received WCK signal, and a host device 105 may use the RDQS signal for sampling a received data signal. Also, the package may include a data mask inversion (DMI) pin that is used to output error management information—e.g., information for detecting and/or correcting errors. In some examples, a package may similarly be used to contain and provide access to and from a host device 105.

The pins of the package may also be coupled with a bus that includes multiple channels 115. In some examples, the DQ pins of the memory device 110 may be coupled with the DQ channel 190, the RDQS pin may be coupled with a CK channel 188 of the bus, and the DMI pin may be coupled with a DMI channel 191 of the bus. In some examples, the pins of the package and/or the channels 115 of the bus may be terminated (e.g., weakly) to a voltage source or voltage sink (e.g., a ground reference). For example, the DQ pins and/or the DQ channel 190 may be terminated to a ground reference 193 via a first impedance 194. Thus, when the bus is not being used (e.g., is in an idle, inactive, or floating state), the voltage of the pins and channels 115 may trend toward the voltage of a coupled voltage source or voltage sink. In some examples, the pins of the package and/or the channels 115 may not be coupled with a voltage source or voltage sink when the bus in not being used—e.g., may be in a floating state. Alternatively, when the bus is being used (e.g., is in an active state) by either the memory device 110 or the host device 105, the voltage of the channels 115 may be driven by the memory device 110 or the host device 105.

Communications between host device 105 and memory device 110 may fail in some circumstances. A failure may include a scenario where a host device 105 receives invalid data from a memory device 110 without determining that the data is invalid. In such cases, the host device 105 may use the invalid data to perform an operation. A failure rate for a system 100 that includes a host device 105 and memory device 110 may be determined by testing multiple similarly-constructed systems for a time interval and determining a quantity of failures that occur per aggregate hour—e.g., if one hundred systems are tested for one hundred hours, the failure rate may determine a quantity of failures that occur in around 10,000 hours. The testing may yield a quantity of failures expected to occur in one billion hours of operation for the system, which may also be referred to as a failure in time (FIT) rate. The system may be configured to have an acceptable FIT rate—e.g., a FIT rate that is below a threshold. The threshold may be set based on the ramifications of a failure. For example, the more severe an injury that may result from a failure, the stricter the FIT rate may be—e.g., the threshold value may be lower (e.g., less than 4 FITs) if the system is deployed in an application used to operate an automobile (e.g., in an autonomous vehicle).

A failure rate of a system may be affected by a type of packaging used for a memory device 110—e.g., a failure rate may increase as a footprint of the packaging decreases or a density of the packaging is increased, or both, and vice versa. In some examples, changing a package used to contain a memory device 110 may cause the FIT rate for a system 100 (that previously satisfied a FIT rate threshold when the memory device 110 was packaged in a prior package) to exceed the FIT rate threshold when the memory device 110 is packaged in a current package—e.g., due to an increased quantity of mechanical failures that may occur, such as soldering failures or shorting scenarios. For example, packaging a memory device 110 in a fine-pitch ball grid array may cause the FIT rate for the system 100 to increase (e.g., to 25.5 FITs) relative to packaging the memory device 110 in a ball grid array having a larger pitch (e.g., from 2.4 FITs).

Packaging errors that cause a bus between the memory device 110 and host device 105 to improperly enter or remain in a floating state may contribute to a FIT rate of a system 100. In such cases, the host device 105 may be unable to determine whether a signal on the bus is a data signal driven by the memory device 110 (which may be referred to as a valid data signal) or a random data signal that results on the bus when the bus is in a floating state (which may be referred to as an invalid data signal). Also, the host device 105 may determine that a random data signal on the bus is a valid data signal and use invalid data obtained from the random data signal to perform an operation, increasing a FIT rate for the system.

A system 100 may employ data-reliability techniques to achieve an acceptable FIT rate for a system 100. For example, the system 100 may store parity bits with data, where the parity bits may be used to detect and/or correct errors in the data when the data is output to a host device 105. In some examples, the parity bits may be used to generate one or more syndrome bits that indicate which bits in a data packet are defective.

Error protection may be applied to a link between the memory device 110 and the host device 105 (e.g., to data transmitted over DQ channel 190). Such error protection may be referred to as link ECC. In such cases, parity information may be generated for data that is to be transmitted to the host device 105, or vice versa. The parity information may then be transmitted with a set of data during a corresponding read operation. The receiving device may use the parity information to determine whether any errors were introduced into the set of data during the transmission of the set of data and, in some examples, to correct detected errors.

A memory device 110 and/or a host device 105 may include a syndrome check circuit. A syndrome check circuit at a memory device 110 may check syndrome bits associated with a set of data and generate an indication (which may be referred to as the syndrome check signal) for a host device 105 that indicates whether there is an error in the data—e.g., if the syndrome bits include any non-zero syndrome bits. In some examples, the memory device 110 transmits the syndrome check signal to the host device 105 during a corresponding read operation. Thus, the syndrome check signal may enable a host device 105 to quickly identify whether received data includes one or more errors. The syndrome check circuit may also be configured to indicate additional information such as a quantity of errors, phantom errors, a type of error, and the like. In some examples, the memory device 110 also signals the syndrome bits used to generate the syndrome check signal to the host device 105—e.g., the memory device may use the syndrome bits as parity information for the link ECC.

The host device 105 may use the syndrome bits to detect and/or correct one or more errors in the received data. In some examples, the host device 105 may compare the received syndrome bits with the syndrome bits computed for the received data to detect (and, in some examples, correct) errors in the received data. In some examples, the error management information provided by the syndrome check signal, in combination with the error management information determined using the link ECC, may be used to decrease the likelihood of a host device 105 attempting to correct and use received data having multiple bit errors (based on detecting from the link ECC that the data has a single bit error). Thus, a host device 105 may use the information to avoid failures that would otherwise contribute to the FIT rate.

The memory device 110 may also include a master error circuit to improve a reliability of data transfer. The master error circuit may enable a memory device 110 to identify errors caused by the memory controller. For example, the master error circuit may identify errors that occur when a memory device 110 writes different data to memory than what is received or outputs different data to a host device 105 than what is stored in memory—e.g., by accessing an incorrect row when writing to or reading from memory.

To reduce a FIT rate of a system caused by failing to detect an idle bus (e.g., due to bus packaging failures), a memory device 110 may use a control signal (which may be referred to as a valid read operation flag (VROF) signal) to indicate when a bus that connects the memory device 110 and a host device 105 is in an idle state (e.g., a floating state) or when the bus is in an active state. That is, the valid read operation flag may be used to indicate whether a read operation is currently being performed by the memory device 110 (e.g., using a high voltage) or that no valid read operation is currently being performed (e.g., using a low voltage). Thus, in some examples, a host device 105 may discard decoded data after determining that the corresponding data signal was obtained from an idle bus (e.g., a floating bus) based on receiving a VROF signal.

In some examples, the VROF signal, syndrome check signal generated by the syndrome check circuit, a syndrome bit signal including the syndrome bits, the master error status signal generated by the master error circuit, or any combination thereof, may be outputted on the DMI pin. The memory device 110 may include a multiplexer that may be used to switch between the VROF signal, the syndrome check signal, the master error status signal, and the link ECC signal.

A first protocol may be used that enables the error management information to be communicated between a memory device 110 and host device 105—the protocol may be referred to as a DSF+ VROF protocol. In such examples, during a first unit interval of a read operation, a VROF signal may be outputted on the DMI pin; during a next set of unit intervals of the read operation, the syndrome check signal may be outputted on the DMI pin; during a following set of unit intervals of the read operation, the master error status signal may be outputted on the DMI pin, and, during a subsequent set of unit intervals of the read operation, the link ECC signal may be outputted on the DMI pin. Concurrently, the data associated with the read operation may be transmitted over the DQ pins during each of the unit intervals. In some examples, a second protocol may be used that enables a portion of the error management information to be communicated between a memory device 110 and host device 105—e.g., a VROF signal may not be transmitted during the first unit interval of a read operation, but the other error management signals may be transmitted during the subsequent unit intervals when the second protocol is enabled, for example, during the same sets of unit intervals as for the first protocol. The second protocol may be referred to as a DSF+ protocol. In some examples, a third protocol may be used that enables a smaller portion of the error management information to be communicated between a memory device 110 and host device 105—e.g., only the link ECC signal may be transmitted during a read operation, for example, during the same set of unit intervals as for the first and second protocols.

The unit intervals may be determined based on a read clock signal outputted on the RDQS pin, where each unit interval corresponds to the duration between a falling edge of the read clock and a subsequent rising edge of the read clock. The read clock may be aligned with the outputting of data packets on the DQ pins. In some examples, the read clock is output by the memory device 110 when the memory device 110 is operated within a particular frequency range. When operating outside of the frequency range, the memory device 110 may not output the read clock signal. In such cases, the unit intervals may be determined based on a write clock signal generated at the host device 105. In some examples, the RDQS signal may be generated using differential signals that correspond to a write clock signal received from the host device 105—e.g., an inverted and non-inverted version of the write clock signal (which may be referred to as a differential strobe technique). In other examples, the RDQS signal may be generated using the non-inverted version of a write clock signal received from the host device 105 (which may be referred to as a single-ended strobe technique).

A host device 105 may use a protocol that does not support communicating one or more of the valid operation signal, the syndrome check signal, or the master error status signal—though, in some examples, the memory device 110 may still generate the underlying data for the signals. Thus, a host device 105 may be unable to receive supplemental error management signaling from a memory device 110. For example, the host device 105 may be unable to receive a valid operation signal, and thus, may be unable to determine whether a valid operation is being performed in a duration during which the operation is expected. Accordingly, communication errors between the memory device 110 and host device 105 may increase—e.g., if the host device 105 uses invalid data obtained during a duration during which the operation was expected to be performed but was not. Thus, a failure rate associated with the memory device may also increase, and, in some examples, may exceed a threshold.

To support the communication of supplemental error management information between a memory device 110 and a host device 105 when a protocol associated with communication supplemental error management information is not supported by the host device 105, enhanced signaling techniques for the supplemental management information may be used.

In some examples, to indicate valid operations in real time, a valid operation signal may be encoded into a link ECC signal by default. For example, the DMI channel 191 may be terminated to a first voltage source (e.g., a first voltage source 195, which may output a high voltage)—e.g., via a second impedance 196. And, in some examples, the DQ channel 190 may be terminated to a second voltage source (e.g., ground reference 193, which may output a voltage that is lower than the high voltage)—e.g., via a first impedance 194. In such cases, if a memory device 110 fails to execute a command transmitted from a host device 105, the bus may remain in an idle state and a voltage of the DMI channel 191 may be at a first voltage (e.g., a high voltage that is representative of the value 1) while a voltage of the lines of the DQ channel 190 may each be at a second voltage (e.g., a low voltage that is representative of the value 0). Thus, while performing an operation associated with the missed command (e.g., an invalid operation), the host device 105 may determine that the link ECC signal represents all logic 1's and that the data signal represents all logic 0's. Accordingly, an error management code computed by the host device 105 for the data decoded from the data signal may not match the error management code decoded from the link ECC signal—e.g., the computed error management code may differ from the received error management code by more than one bit. In such cases, the host device 105 may discard the decoded data, effectively detecting an invalid operation and preventing a failure from occurring.

Alternatively, if the memory device 110 executes the command, the memory device 110 may drive the bus (e.g., the bus may enter an active state). In such cases, the memory device 110 may drive the voltage of the lines of the DQ channel 190 based on the data to be communicated and the voltage of the DMI channel 191 based on the error management code computed for the data. Accordingly, while performing an operation associated with the missed command (e.g., a valid operation), a host device 105 may determine a set of data represented by the data signal and an error management signal represented by the link ECC signal. In some examples, the host device 105 may use the error management signal to detect, and in some examples, correct errors in the decoded set of data.

In some examples, a size of the first impedance 194 and the second impedance 196 may be selected to be easily overridden. That is, the first impedance 194 and the second impedance 196 may be selected so that the corresponding channels are weakly terminated to the corresponding voltage sources—e.g., by configuring the first impedance 194 and the second impedance 196 to have large values.

By terminating an error management channel and data channel to complementary voltage sources, whether a valid operation is being performed for a transmitted command may be indicated in real-time.

Figure 2:
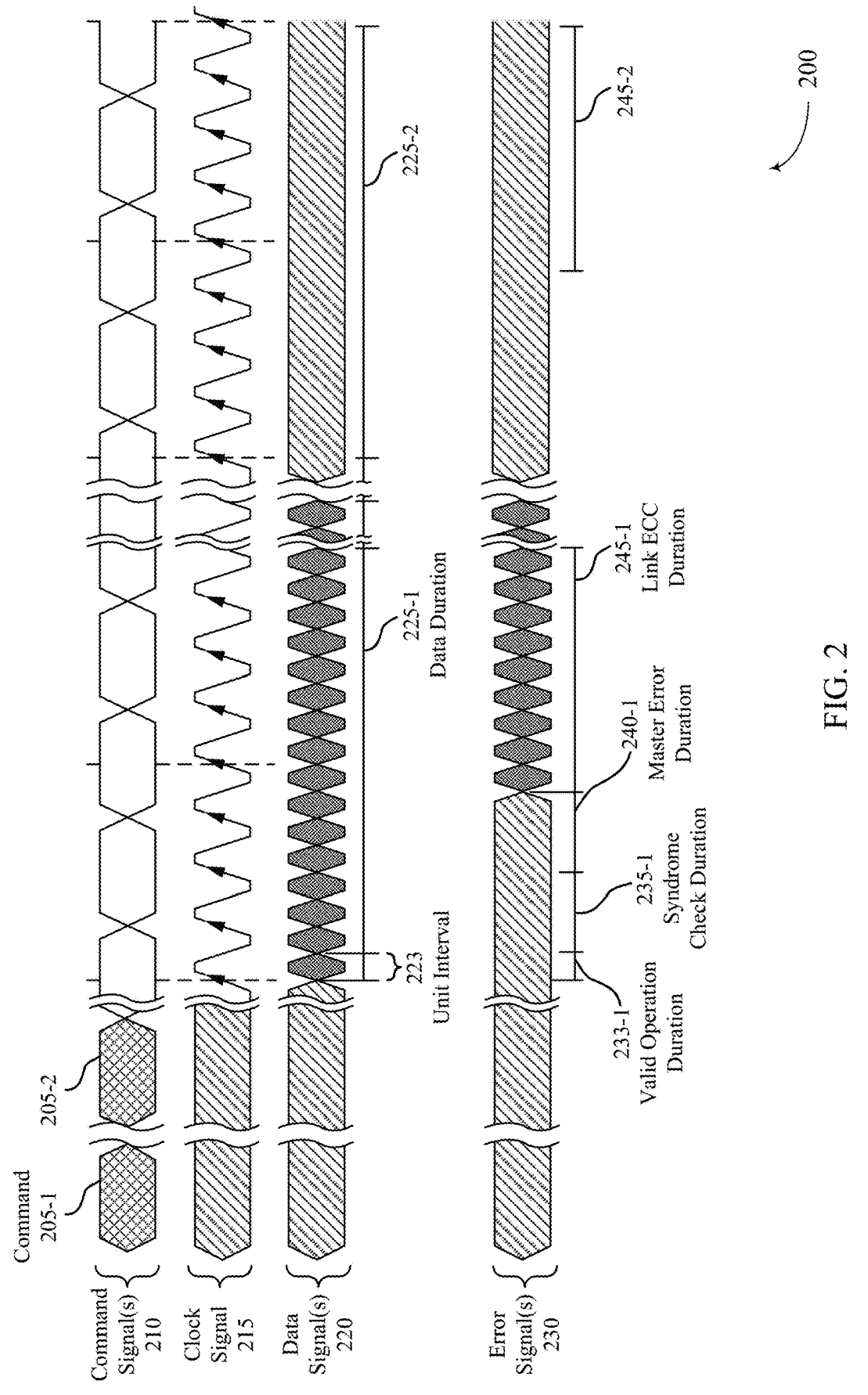
FIG. 2 illustrates an example of a signal diagram that supports detecting data bus drive faults in accordance with examples as disclosed herein.

FIG. 2 illustrates an example of a signal diagram that supports detecting data bus drive faults in accordance with examples as disclosed herein.

Signal diagram 200 depicts representations of a set of signals being transmitted during a time interval. Signal diagram 200 includes a representation of one or more command signals 210, a clock signal 215, one or more data signals 220, and one or more error signals 230. In some examples, command signals 210 may be communicated over a command/address channel (such as CA channel 186 of FIG. 1). Clock signal 215 may be communicated over a clock channel (such as CK channel 188 of FIG. 1). Data signals 220 may be communicated over a data channel (such as DQ channel 190 of FIG. 1). And error signals 230 may be communicated over an error management channel (such as DMI channel 191 of FIG. 1).

Commands 205 may be received in command signal 210. Among other types of commands, commands 205 may be read commands, write commands, or a combination thereof. Commands 205 may trigger data to be transmitted in data signal 220. In some examples, first command 205-1 triggers data to be transmitted during first data duration 225-1. First command 205-1 may also trigger clock signal 215 to be generated. Clock signal 215 may be an RDQS clock signal. In some examples, clock signal 215 is used to designate unit intervals 223, where a unit interval may span a duration between a rising edge and falling edge of a clock pulse. In some examples, new sets of information (e.g., sets of data, error management bits, etc.) may be transmitted each unit interval 223. In some examples, a WCK signal is received before a command 205 is received, where a beginning of the WCK signal may indicate that a command 205 is forthcoming. In some examples, the RDQS clock is generated based on the WCK signal. A period between receiving a WCK signal and receiving a command may be referred to as a qualified time.

Error management information may be communicated with data to enable the detection and correction of errors in the data. In some examples, the error management information may be transmitted during corresponding duration. For example, a valid operation flag (e.g., a VROF) may be transmitted during first valid operation duration 233-1, a syndrome check signal may be transmitted during first syndrome check duration 235-1, a master error status may be transmitted during first master error duration 240-1, and an error correction code (e.g., parity bits) may be transmitted during first link ECC duration 245-1. First valid operation duration 233-1 may span a first unit interval of first data duration 225-1, first syndrome check duration may span a next three unit intervals of first data duration 225-1, first master error duration 240-1 may span a following three unit interval of first data duration 225-1, and first link ECC duration may span the following nine unit intervals of first data duration 225-1.

One or more of a valid operation signal, syndrome check signal, or master error status signal may not be communicated—e.g., if a configured communication protocol does not support communication of such error management signaling. For example, a VROF signal may not be transmitted during a valid operation duration 233, which may correspond to a first unit interval of a data duration 225. Additionally, or alternatively, a syndrome check signal may not be transmitted during a first syndrome check duration 235-1. In such cases, a voltage of error signal 230 may be at a first voltage level during valid operation durations 233, syndrome check durations 235, master error durations 240, or a combination thereof, when a DMI pin is not being driven—e.g., based on a termination of the DMI pin to a voltage source or voltage sink providing the first voltage level. Or at an indeterminate voltage level—e.g., if the DMI pin is in a floating state when the DMI pin is not being driven.

Also, in some examples, no data signaling or error management signaling may be transmitted for a transmitted command (e.g., second command 205-2)—e.g., if a memory device fails to process (e.g., receive or decode) the transmitted command. In such cases, data signal 220 and error signal 230 may be at a terminated voltage level or at an indeterminate voltage level. Also, the device that transmitted the command (e.g., a host device) may be unable to determine on its own that the memory device failed to process the command. Thus, in some examples, the transmitting device may assume that the voltages of data signal 220 on a DQ channel during second data duration 225-2 represent valid data (e.g., all 0's) and that the voltage of error signal 230 on a DMI channel during second link ECC duration 245-2 represent valid link ECC information (e.g., all 0's). Accordingly, the transmitting device may compute parity information for data signal 220 (e.g., which may be all 0's when the data signal represents all 0's) and determine that the parity information matches the link ECC information (e.g., which be all 0's). Based on the computed parity information matching the link ECC information, the transmitting device may determine that the received data is valid and attempt to use the received data despite the received data being invalid, resulting in a failure.

A DMI pin may be terminated to a first voltage source that outputs a first voltage (e.g., a high voltage) and a set of data pins may be terminated to a second voltage source that outputs a second voltage (e.g., a ground reference) to enable a host device to determine whether a valid operation is currently being executed for a command transmitted to a memory device. In such cases, a voltage of the error signal 230 may be at a high level throughout first valid operation duration 233-1, first syndrome check duration 235-1, and first master error duration 240-1. Also, in some examples (e.g., after failing to receive second command 205-2), a voltage of the error signal 230 may be trend to a high voltage level prior to a beginning of second data duration 225-2 and throughout second link ECC duration 245-2. Also, a voltage of data signal 220 may trend to a low voltage level (e.g., if the DQ channel is terminated to a ground reference) or to indeterminate voltage levels (e.g., if the DQ channel is in a floating state).

In such cases, a host device may assume that the voltages of data signal 220 on a DQ channel during second data duration 225-2 (e.g., which may represent all 0's) represent valid data and that the voltage of error signal 230 on a DMI channel during second link ECC duration 245-2 (e.g., which may now represent all 1's) represent valid link ECC information. Accordingly, the transmitting device may compute parity information for data signal 220 (e.g., which may represent all 0's when the data signal represents all 0's) and determine that the parity information is different than the link ECC information (e.g., which may also represent all 0's). Based on the computed parity information being different than the link ECC information (e.g., by more than one bit), the transmitting device may determine that the received data is invalid and discard the data.

Instead of computing the parity information, host device may discard the data after determining that data signal 220 during second data duration 225-2 represents all 0's and the error signal 230 during second link ECC duration 245-2 represents all 1's—e.g., using separate logic circuitry than the error management circuitry. In some examples, the host device performs the operations checking for this signaling state before performing error management operations using data and an error correction code obtained from the data signal 220 and the error signal 230. In some examples, the host device performs the operations checking for this signaling state while performing the error management operations. In some examples, the host device may terminate the error management operations early based on a result of the checking operation—e.g., if the checking operation identifies the signaling state.

Figure 3:
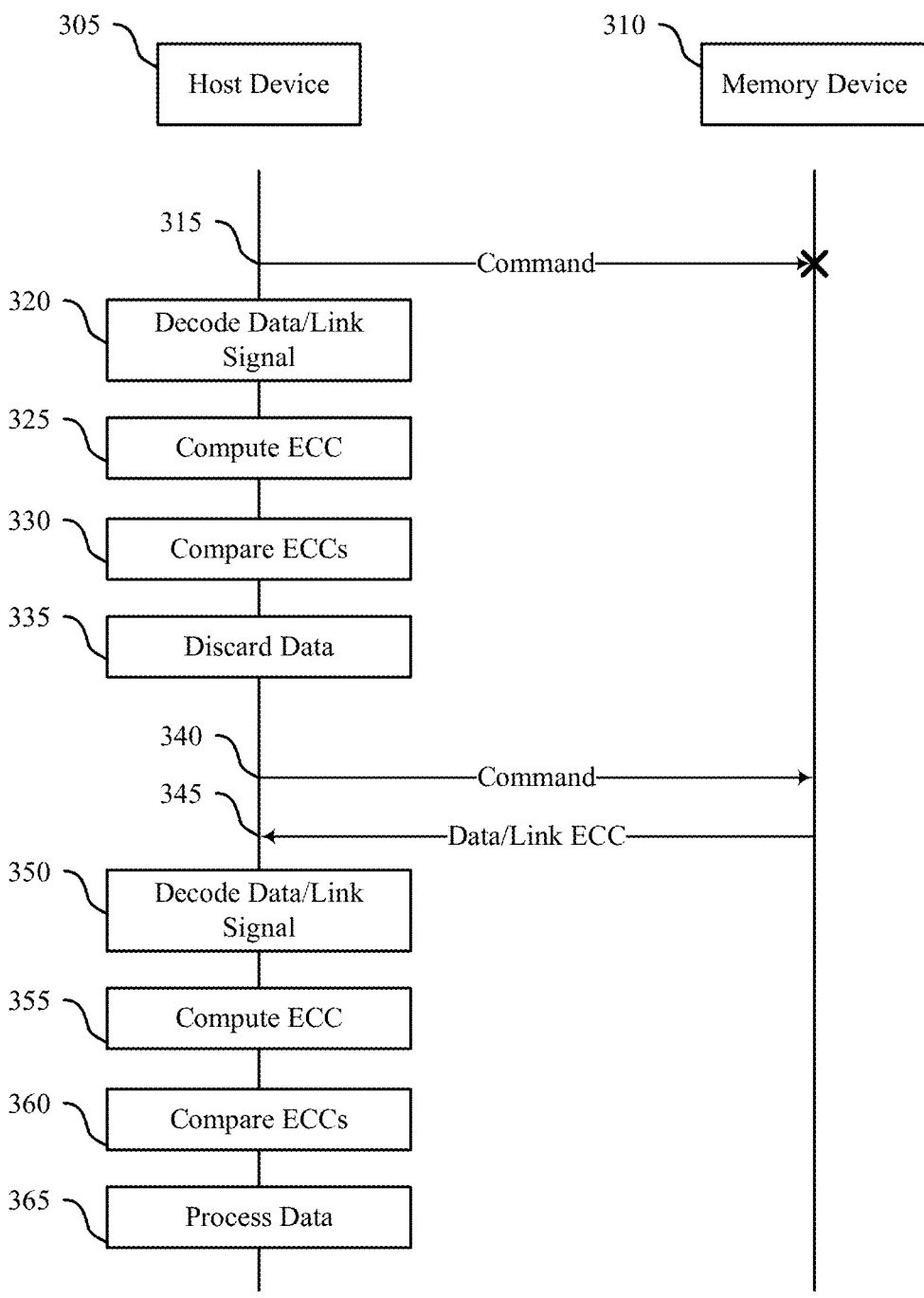
FIG. 3 illustrates an example set of operations for detecting data bus drive faults in accordance with examples as disclosed herein.

FIG. 3 illustrates an example of a set of operations for detecting data bus drive faults in accordance with examples as disclosed herein.

Process flow 300 may be performed by host device 305 and memory device 310, which may be respective examples of a host device and memory device described with reference to FIGS. 1 and 2. In some examples, process flow 300 illustrates an example sequence of operations performed to support detecting data bus drive faults. For example, process flow 300 depicts operations for detecting invalid data that is obtained when a bus between host device 305 and memory device 310 is in an idle state—e.g., after a command transmitted from host device 305 is missed by memory device 310.

The operations described in process flow 300 may be performed earlier or later in the process, omitted, replaced, supplemented, or combined with another operation. Also, additional operations described herein that are not included in process flow 300 may be included.

As described herein, a DMI pin of memory device 310 may be terminated to a first voltage source (e.g., a voltage source that outputs a high voltage level) and the DQ pins of memory device 310 may be terminated to a second voltage source (e.g., a voltage source that outputs a low voltage level). In some examples, a data bus between host device 305 and memory device 310 may be in an idle state (e.g., the active communication of data between host device 305 and memory device 310 may not be occurring). While the data bus is idle, the voltage of the DMI pin and DMI channel may be at or near the voltage of the first voltage source and the voltage of the DQ pins and DQ channel may be at or near the voltage of the second voltage source.

At arrow 315, host device 305 may transmit a command to memory device 310. The command may be a read command. In some examples, the command may not be successfully processed by memory device 310. In some examples, interference to the command/address lines, shorts at a package used for memory device 310, and the like may result in memory device 310 failing to receive and/or decode the command transmitted by host device 305. Thus, memory device 310 may not be triggered to execute a sequence of operations associated with the command. Accordingly, a voltage of the DMI pin may remain at or near the voltage of the high voltage source.

At block 320, host device 305 may decode data signals detected from a set of DQ lines—e.g., during a duration associated with the communicating data for the transmitted command. That is, host device 305 may decode data signals detected from a set of DQ lines in a duration during which host device 305 expects memory device 310 to communicate data requested by the command transmitted by host device 305. However, memory device 310 may not communicate any data during the data duration because of the failure to process (e.g., receive or decode) the command. As described herein, in some examples, host device 305 may detect invalid data signals on the DQ lines that are not being driven by memory device 310 (e.g., a signal representing all 0's)—e.g., during a data duration corresponding to a read command transmitted by host device 305. Host device 305 may detect a data signal on the DQ lines that represents all 0's based on the DQ pins being terminated to the low voltage source.

Host device 305 may also detect an error detection signal on the DMI line that is not being driven by memory device 310—e.g., during a link ECC duration corresponding to a read command transmitted by host device 305. Based on the DMI pin being terminated to the high voltage source, host device 305 may detect a link ECC signal on the DMI line that represents all 1's—that is based on a voltage of the DMI line being at a high voltage level.

At block 325, host device 305 may compute an error correction code (e.g., a parity code) based on the decoded data. In examples when the decoded data includes all 0's, host device 305 may compute an error correction code that include all 0's.

At block 330, host device 305 may compare the computed error correction code with the error correction code decoded from the link ECC signal (which may be referred to as the link error correction code). As described herein, the link ECC signal may include all 1's based on the DMI pin being terminated to the high voltage source. Based on comparing the computed error correction code with the link error correction code, host device 305 may determine that the computed error correction code is different than the link error correction code.

At block 335, host device 305 may discard the data based on determining that the computed error correction code is different than the link error correction code. In some examples, host device 305 discards the data based on more than one bit of the computed error correction code and the link ECC code being different—e.g., based on determining that there is an uncorrectable error in the decoded data.

At arrow 340, host device 305 may transmit a second command to memory device 310. In some examples, the second command is a read command. Memory device 310 may successfully process (e.g., receive and decode) the second command received from memory device. In some examples, memory device 310 may determine that the second command is a read command based on successfully processing the second command.

At arrow 345, memory device 310 may transmit a set of data (e.g., via the DQ lines in a data signal) and link error correction code (e.g., via the DMI line in a link ECC signal) in response to receiving the command.

At block 350, host device 305 may decode the data signal and link ECC signal to obtain a set of data and a link error correction code. In some examples, the link error correction code is a non-zero binary value that is generated based on the set of data transmitted by memory device 310.

At block 355, host device 305 may compute an error correction code based on the received data signal. In some examples, the computed error correction code is a non-zero binary value that is generated based on the set of data decoded by host device 305.

At block 360, host device 305 may compare the computed error correction code with the link error correction code. In some examples, host device 305 determines that the computed error correction code is the same as the link error correction code. In such cases, host device 305 may use the decoded data. In some examples, host device 305 determines that the computed error correction code is different than the link error correction code. In some examples, after determining the computed and link error correction codes are different, host device 305 may correct the decoded data—e.g., if a single bit of the computed and link error correction codes is different. In other examples, after determining the computed and link error correction codes are different, host device 305 may discard the decoded data—e.g., if multiple bits of the computed and link error correction codes are different.

At block 365, host device 305 may use the decoded data based on determining that the computed ECC and link ECC are the same. In some examples, host device 305 may correct the decoded data based on determining that the computed ECC and link ECC are different and use the corrected data.

Figure 4:
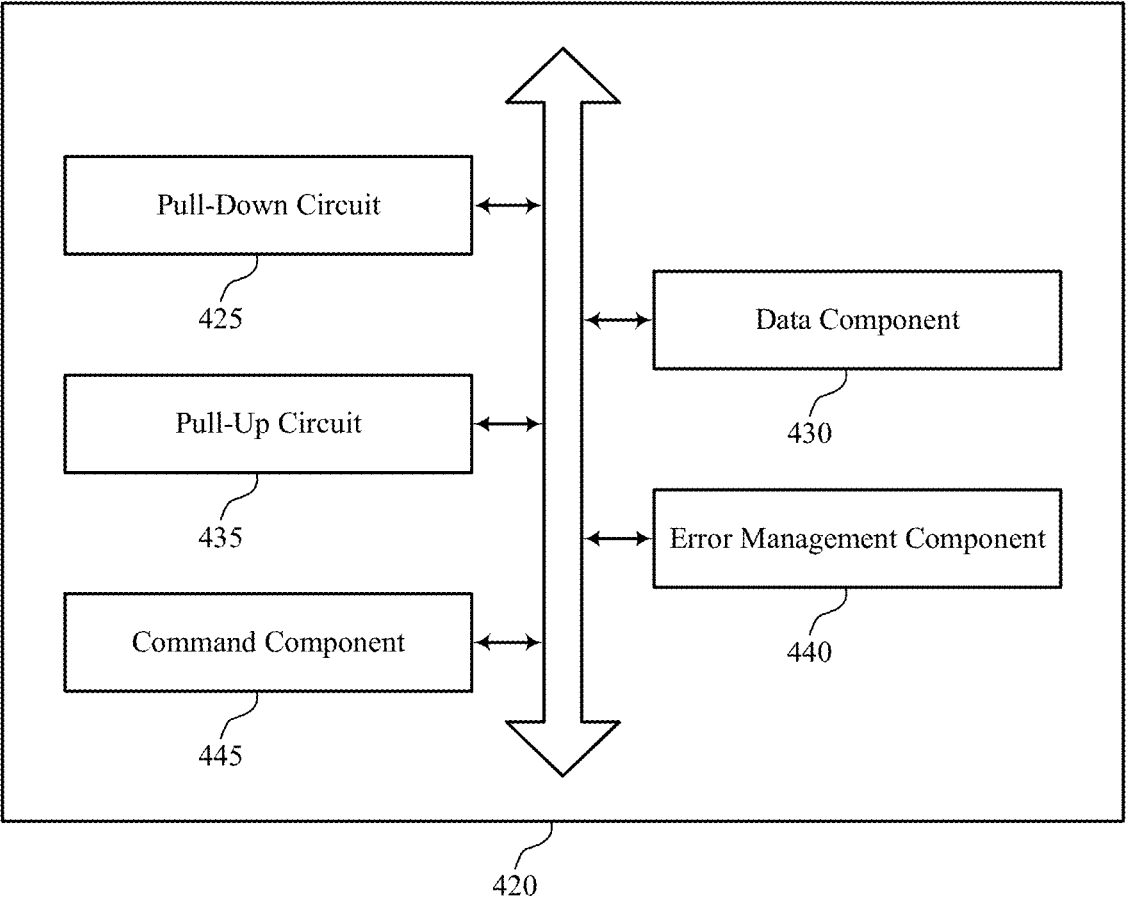
FIG. 4 shows a block diagram of a memory device that supports detecting data bus drive faults in accordance with examples as disclosed herein.

FIG. 4 shows a block diagram 400 of a memory device 420 that supports detecting data bus drive faults in accordance with examples as disclosed herein. The memory device 420 may be an example of aspects of a memory device as described with reference to FIGS. 1 through 3. The memory device 420, or various components thereof, may be an example of means for performing various aspects of detecting data bus drive faults as described herein. For example, the memory device 420 may include a pull-down circuit 425, a data component 430, a pull-up circuit 435, an error management component 440, a command component 445, or any combination thereof. Each of these components may communicate, directly or indirectly, with one another (e.g., via one or more buses).

The pull-down circuit 425 may be configured as or otherwise support a means for applying, in response to the set of data pins being in an idle state, a first voltage to a set of data pins. The data component 430 may be configured as or otherwise support a means for outputting, by the set of data pins, a first signal based at least in part on applying the first voltage to the set of data pins. The pull-up circuit 435 may be configured as or otherwise support a means for applying, in response to the pin being in the idle state, a second voltage to a pin associated with communicating error correction information, the second voltage being different than the first voltage. The error management component 440 may be configured as or otherwise support a means for outputting, by the pin, a second signal based at least in part on applying the second voltage to the pin, a validity of the first signal being indicated by the second signal.

In some examples, the command component 445 may be configured as or otherwise support a means for receiving a command associated with reading data stored at a memory device. In some examples, the data component 430 may be configured as or otherwise support a means for retrieving a set of data in response to the command. In some examples, the data component 430 may be configured as or otherwise support a means for applying, based at least in part on the set of data, a set of voltages to the set of data pins during a first duration of a read operation triggered by the command.

In some examples, the error management component 440 may be configured as or otherwise support a means for generating an error correction code for the set of data based at least in part on retrieving the set of data. In some examples, the error management component 440 may be configured as or otherwise support a means for applying, based at least in part on the error correction code, a second set of voltages to the pin during a second duration of the read operation.

In some examples, the second set of voltages applied to the pin overrides the second voltage applied to the pin.

In some examples, the error correction code indicates a validity of the set of data.

In some examples, the second signal output by the pin represents an error correction code that indicates a validity of a set of data represented by the first voltage during a first duration of a read operation.

In some examples, the first signal and the second signal are configured to indicate an absence of a valid read operation executed by a memory device based at least in part on the first signal having the first voltage during a first duration of a read operation and the second signal having the second voltage during a second duration of the read operation.

In some examples, the second voltage is applied to the pin based at least in part on a circuit that couples the pin with a voltage source.

Figure 5:
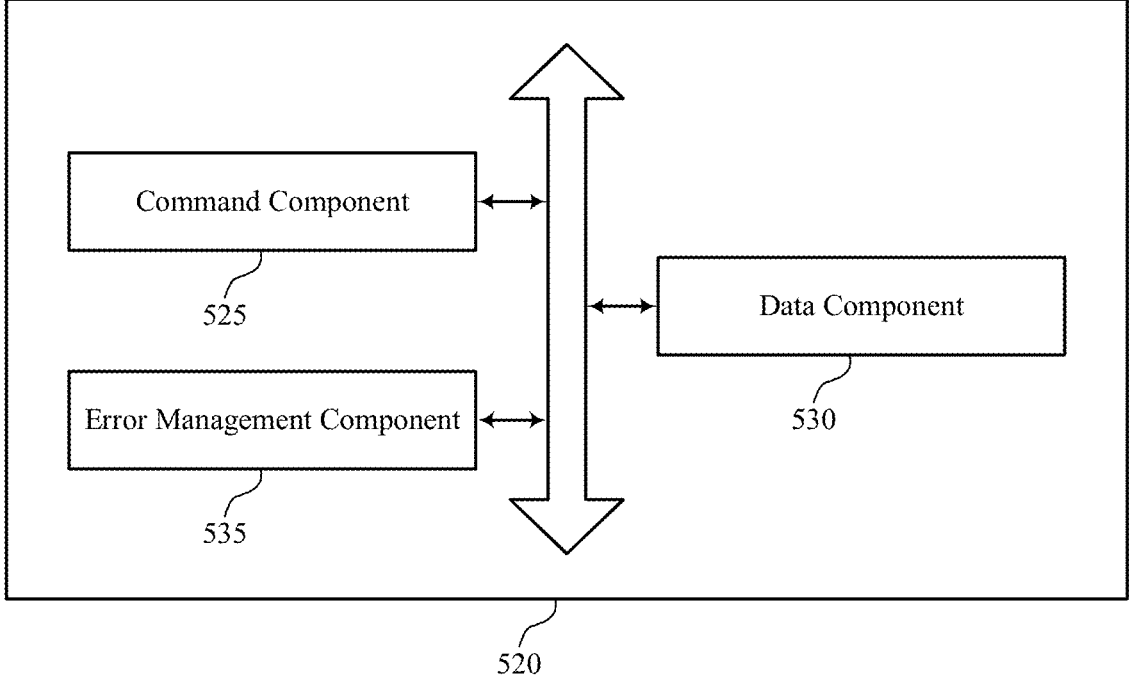
FIG. 5 shows a block diagram of a host device that supports detecting data bus drive faults in accordance with examples as disclosed herein.

FIG. 5 shows a block diagram 500 of a host device 520 that supports detecting data bus drive faults in accordance with examples as disclosed herein. The host device 520 may be an example of aspects of a host device as described with reference to FIGS. 1 through 3. The host device 520, or various components thereof, may be an example of means for performing various aspects of detecting data bus drive faults as described herein. For example, the host device 520 may include a command component 525, a data component 530, an error management component 535, or any combination thereof. Each of these components may communicate, directly or indirectly, with one another (e.g., via one or more buses).

The command component 525 may be configured as or otherwise support a means for transmitting, to a memory device, a command associated with reading data stored at the memory device. The data component 530 may be configured as or otherwise support a means for detecting, based at least in part on transmitting the command and during a first time period associated with communicating data requested by the command, a set of signals at a set of data pins, where each signal of the set of signals includes a first voltage level. The error management component 535 may be configured as or otherwise support a means for detecting, based at least in part on transmitting the command and during a second time period associated with communicating error correction information for the data requested by the command, a signal at a pin associated with communicating the error correction information, where the signal includes a second voltage level. In some examples, the error management component 535 may be configured as or otherwise support a means for determining the data associated with the set of signals is invalid based at least in part on the voltage of each signal of the set of signals being the first voltage level for the first time period and the voltage of the signal being equivalent to the second voltage level for the second time period. In some examples, the data component 530 may be configured as or otherwise support a means for discarding the data based at least in part on determining the data is invalid.

In some examples, the error management component 535 may be configured as or otherwise support a means for generating, based at least in part on the set of signals detected at the set of data pins, a first error correction code based at least in part on a set of data represented by the set of signals. In some examples, the error management component 535 may be configured as or otherwise support a means for determining, based at least in part on the signal detected at the pin, a second error correction code. In some examples, the error management component 535 may be configured as or otherwise support a means for comparing the first error correction code with the second error correction code.

In some examples, to support determining that the data associated with the set of signals is invalid, the error management component 535 may be configured as or otherwise support a means for determining that the data associated with the set of signals is invalid based at least in part on the first error correction code being different than the second error correction code.

In some examples, the data component 530 may be configured as or otherwise support a means for determining that a read operation associated with the command is invalid based at least in part on the first error correction code being different than the second error correction code, where the data associated with the set of signals is determined as invalid based on determining that the read operation is invalid.

In some examples, the data component 530 may be configured as or otherwise support a means for entering a mode of operation associated with ignoring data received from the memory device based at least in part on determining that the data is invalid.

In some examples, the voltage of the signal is equivalent to the second voltage level for the second time period based at least in part on a circuit that couples the pin with a voltage source. In some examples, the first time period and the second time period overlap.

FIG. 6 shows a flowchart illustrating a method 600 that supports detecting data bus drive faults in accordance with examples as disclosed herein. The operations of method 600 may be implemented by a memory device or its components as described herein. For example, the operations of method 600 may be performed by a memory device as described with reference to FIGS. 1 through 4. In some examples, a memory device may execute a set of instructions to control the functional elements of the device to perform the described functions. Additionally, or alternatively, the memory device may perform aspects of the described functions using special-purpose hardware.

At 605, the method may include applying, in response to the set of data pins being in an idle state, a first voltage to a set of data pins. The operations of 605 may be performed in accordance with examples as disclosed herein. In some examples, aspects of the operations of 605 may be performed by a pull-down circuit 425 as described with reference to FIG. 4.

At 610, the method may include outputting, by the set of data pins, a first signal based at least in part on applying the first voltage to the set of data pins. The operations of 610 may be performed in accordance with examples as disclosed herein. In some examples, aspects of the operations of 610 may be performed by a data component 430 as described with reference to FIG. 4.

At 615, the method may include applying, in response to the pin being in the idle state, a second voltage to a pin associated with communicating error correction information, the second voltage being different than the first voltage. The operations of 615 may be performed in accordance with examples as disclosed herein. In some examples, aspects of the operations of 615 may be performed by a pull-up circuit 435 as described with reference to FIG. 4.

At 620, the method may include outputting, by the pin, a second signal based at least in part on applying the second voltage to the pin, a validity of the first signal being indicated by the second signal. The operations of 620 may be performed in accordance with examples as disclosed herein. In some examples, aspects of the operations of 620 may be performed by an error management component 440 as described with reference to FIG. 4.

In some examples, an apparatus as described herein may perform a method or methods, such as the method 600. The apparatus may include, features, circuitry, logic, means, or instructions (e.g., a non-transitory computer-readable medium storing instructions executable by a processor) for applying, in response to the set of data pins being in an idle state, a first voltage to a set of data pins, outputting, by the set of data pins, a first signal based at least in part on applying the first voltage to the set of data pins, applying, in response to the pin being in the idle state, a second voltage to a pin associated with communicating error correction information, the second voltage being different than the first voltage, and outputting, by the pin, a second signal based at least in part on applying the second voltage to the pin, a validity of the first signal being indicated by the second signal.

Some examples of the method 600 and the apparatus described herein may further include operations, features, circuitry, logic, means, or instructions for receiving a command associated with reading data stored at a memory device, retrieving a set of data in response to the command, and applying, based at least in part on the set of data, a set of voltages to the set of data pins during a first duration of a read operation triggered by the command.

Some examples of the method 600 and the apparatus described herein may further include operations, features, circuitry, logic, means, or instructions for generating an error correction code for the set of data based at least in part on retrieving the set of data and applying, based at least in part on the error correction code, a second set of voltages to the pin during a second duration of the read operation.

In some examples of the method 600 and the apparatus described herein, the second set of voltages applied to the pin overrides the second voltage applied to the pin.

In some examples of the method 600 and the apparatus described herein, the error correction code indicates a validity of the set of data.

In some examples of the method 600 and the apparatus described herein, the second signal output by the pin represents an error correction code that indicates a validity of a set of data represented by the first voltage during a first duration of a read operation.

In some examples of the method 600 and the apparatus described herein, the first signal and the second signal may be configured to indicate an absence of a valid read operation executed by a memory device based at least in part on the first signal having the first voltage during a first duration of a read operation and the second signal having the second voltage during a second duration of the read operation.

In some examples of the method 600 and the apparatus described herein, the second voltage may be applied to the pin based at least in part on a circuit that couples the pin with a voltage source.

FIG. 7 shows a flowchart illustrating a method 700 that supports detecting data bus drive faults in accordance with examples as disclosed herein. The operations of method 700 may be implemented by a host device or its components as described herein. For example, the operations of method 700 may be performed by a host device as described with reference to FIGS. 1 through 3 and 5. In some examples, a host device may execute a set of instructions to control the functional elements of the device to perform the described functions. Additionally, or alternatively, the host device may perform aspects of the described functions using special-purpose hardware.

At 705, the method may include transmitting, to a memory device, a command associated with reading data stored at the memory device. The operations of 705 may be performed in accordance with examples as disclosed herein. In some examples, aspects of the operations of 705 may be performed by a command component 525 as described with reference to FIG. 5.

At 710, the method may include detecting, based at least in part on transmitting the command and during a first time period associated with communicating data requested by the command, a set of signals at a set of data pins, where each signal of the set of signals includes a first voltage level. The operations of 710 may be performed in accordance with examples as disclosed herein. In some examples, aspects of the operations of 710 may be performed by a data component 530 as described with reference to FIG. 5.

At 715, the method may include detecting, based at least in part on transmitting the command and during a second time period associated with communicating error correction information for the data requested by the command, a signal at a pin associated with communicating the error correction information, where the signal includes a second voltage level. The operations of 715 may be performed in accordance with examples as disclosed herein. In some examples, aspects of the operations of 715 may be performed by an error management component 535 as described with reference to FIG. 5.

At 720, the method may include determining the data associated with the set of signals is invalid based at least in part on the voltage of each signal of the set of signals being the first voltage level for the first time period and the voltage of the signal being equivalent to the second voltage level for the second time period. The operations of 720 may be performed in accordance with examples as disclosed herein. In some examples, aspects of the operations of 720 may be performed by an error management component 535 as described with reference to FIG. 5.

At 725, the method may include discarding the data based at least in part on determining the data is invalid. The operations of 725 may be performed in accordance with examples as disclosed herein. In some examples, aspects of the operations of 725 may be performed by a data component 530 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for transmitting, to a memory device, a command associated with reading data stored at the memory device, detecting, based at least in part on transmitting the command and during a first time period associated with communicating data requested by the command, a set of signals at a set of data pins, where each signal of the set of signals includes a first voltage level, detecting, based at least in part on transmitting the command and during a second time period associated with communicating error correction information for the data requested by the command, a signal at a pin associated with communicating the error correction information, where the signal includes a second voltage level, determining the data associated with the set of signals is invalid based at least in part on the voltage of each signal of the set of signals being the first voltage level for the first time period and the voltage of the signal being equivalent to the second voltage level for the second time period, and discarding the data based at least in part on determining the data is invalid.

In some examples of the method 700 and the apparatus described herein, generating, based at least in part on the set of signals detected at the set of data pins, a first error correction code based at least in part on a set of data represented by the set of signals, determining, based at least in part on the signal detected at the pin, a second error correction code, and comparing the first error correction code with the second error correction code.

In some examples of the method 700 and the apparatus described herein, determining that the data associated with the set of signals may be invalid may include operations, features, circuitry, logic, means, or instructions for determining that the data associated with the set of signals may be invalid based at least in part on the first error correction code being different than the second error correction code.

Some examples of the method 700 and the apparatus described herein may further include operations, features, circuitry, logic, means, or instructions for determining that a read operation associated with the command may be invalid based at least in part on the first error correction code being different than the second error correction code, where the data associated with the set of signals may be determined as invalid based on determining that the read operation may be invalid.

Some examples of the method 700 and the apparatus described herein may further include operations, features, circuitry, logic, means, or instructions for entering a mode of operation associated with ignoring data received from the memory device based at least in part on determining that the data may be invalid.

In some examples of the method 700 and the apparatus described herein, the voltage of the signal may be equivalent to the second voltage level for the second time period based at least in part on a circuit that couples the pin with a voltage source.

In some examples of the method 700 and the apparatus described herein, the first time period and the second time period overlap.

It should be noted that the methods described herein describe possible implementations, and that the operations and the steps may be rearranged or otherwise modified and that other implementations are possible. Further, portions from two or more of the methods may be combined.

An apparatus is described. The apparatus may include a set of data pins, a pin associated with communicating error correction information, a first circuit coupled with the set of data pins and configured to bias the set of data pins to a first voltage level in response to the set of data pins being in an idle state, and a second circuit coupled with the pin and configured to bias the pin to a second voltage level in response to the pin being in the idle state, the second voltage level being different than the first voltage level.

In some examples, the apparatus may include a ground reference configured to supply the first voltage level and a voltage source configured to supply the second voltage level.

In some examples of the apparatus, the first circuit includes a first impedance positioned between the set of data pins and the ground reference and the second circuit includes a second impedance positioned between the pin and the voltage source.

In some examples, the apparatus may include a driver coupled with the pin and configured to apply a sequence of voltages to the pin, where the sequence of voltages applied by the driver may be configured to override the second voltage level applied by the second circuit.

In some examples, the apparatus may include a first set of data lines coupled with the set of data pins, where the first circuit may be coupled with the first set of data lines and a line associated with communicating the error correction information and coupled with the pin, where the second circuit may be coupled with the line.

In some examples, the apparatus may include a bus configured to receive commands from a host device.

Another apparatus is described. The apparatus may include a memory array including an array of memory cells that each include capacitive storage elements, a circuit coupled with the memory array and configured to cause the apparatus to, apply, in response to the set of data pins being in an idle state, a first voltage to a set of data pins, output, by the set of data pins, a first signal based at least in part on the first voltage being applied to the set of data pins, apply, in response to the pin being in the idle state, a second voltage to a pin associated with communicating error correction information, the second voltage being different than the first voltage, and output, by the pin, a second signal based at least in part on the second voltage being applied to the pin, a validity of the first signal being indicated by the second signal.

In some examples, the circuit may be further configured to cause the apparatus to receive a command associated with reading data stored at a memory device, retrieve a set of data in response to the command, and apply, based at least in part on the set of data, a set of voltages to the set of data pins during a first duration of a read operation triggered by the command.

In some examples, the circuit may be further configured to cause the apparatus to generate an error correction code for the set of data based at least in part on retrieving the set of data and apply, based at least in part on the error correction code, a second set of voltages to the pin during a second duration of the read operation.

In some examples of the apparatus, the second signal output by the pin represents an error correction code that indicates a validity of a set of data represented by the first voltage during a first duration of a read operation.

Another apparatus is described. The apparatus may include a memory array including an array of memory cells that each include capacitive storage elements, a circuit coupled with the memory array and configured to cause the apparatus to, transmit, to a memory device, a command associated with reading data stored at the memory device, detect, based at least in part on transmitting the command and during a first time period associated with communicating data requested by the command, a set of signals at a set of data pins, where each signal of the set of signals includes a first voltage level, detect, based at least in part on transmitting the command and during a second time period associated with communicating error correction information for the data requested by the command, a signal at a pin associated with communicating the error correction information, where the signal includes a second voltage level, determine the data associated with the set of signals is invalid based at least in part on the voltage of each signal of the set of signals being the first voltage level for the first time period and the voltage of the signal being equivalent to the second voltage level for the second time period, and discard the data based at least in part on determining the data is invalid.

In some examples of the apparatus, the circuit may be further configured to cause the apparatus to generate, based at least in part on the set of signals detected at the set of data pins, a first error correction code based at least in part on a set of data represented by the set of signals, determine, based at least in part on the signal detected at the pin, a second error correction code, and compare the first error correction code with the second error correction code.

In some examples, the circuit may be further configured to cause the apparatus to determine that the data associated with the set of signals may be invalid based at least in part on the first error correction code being different than the second error correction code.

In some examples, the circuit may be further configured to cause the apparatus to determine that the data associated with the set of signals may be invalid based at least in part on the first error correction code being different than the second error correction code.

In some examples, the circuit may be further configured to cause the apparatus to enter a mode of operation associated with ignoring data received from the memory device based at least in part on determining that the data may be invalid.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:

transmitting, to a memory system, a command associated with reading data stored at the memory system;

detecting, based at least in part on transmitting the command and during a first time period associated with communicating data requested by the command, a set of signals at a set of data pins, wherein each signal of the set of signals comprises a first voltage level;

detecting, based at least in part on transmitting the command and during a second time period associated with communicating error correction information for the data requested by the command, a signal at an error correction information pin associated with communicating the error correction information, wherein the signal comprises a second voltage level;

determining the data associated with the set of signals is invalid based at least in part on a voltage of each signal of the set of signals being equivalent to the first voltage level for the first time period and a voltage of the signal being equivalent to the second voltage level for the second time period; and discarding the data based at least in part on determining the data is invalid.

2. The method of claim 1, further comprising:

generating, based at least in part on the set of signals detected at the set of data pins, a first error correction code based at least in part on a set of data represented by the set of signals;

determining, based at least in part on the signal detected at the error correction information pin, a second error correction code; and comparing the first error correction code with the second error correction code.

3. The method of claim 2, wherein determining that the data associated with the set of signals is invalid comprises:

determining that the data associated with the set of signals is invalid based at least in part on the first error correction code being different than the second error correction code.

4. The method of claim 2, further comprising:

determining that a read operation associated with the command is invalid based at least in part on the first error correction code being different than the second error correction code, wherein the data associated with the set of signals is determined as invalid based on determining that the read operation is invalid.

5. The method of claim 1, further comprising:

entering a mode of operation associated with ignoring data received from the memory system based at least in part on determining that the data is invalid.

6. The method of claim 1, wherein the voltage of the signal is equivalent to the second voltage level for the second time period based at least in part on a circuit that couples the error correction information pin with a voltage source.

7. The method of claim 1, wherein the first time period and the second time period overlap.

8. A host system, comprising:

circuitry configured to cause the host system to:

transmit, to a memory system, a command associated with reading data stored at the memory system;

detect, based at least in part on transmitting the command and during a first time period associated with communicating data requested by the command, a set of signals at a set of data pins, wherein each signal of the set of signals comprises a first voltage level;

detect, based at least in part on transmitting the command and during a second time period associated with communicating error correction information for the data requested by the command, a signal at an error correction information pin associated with communicating the error correction information, wherein the signal comprises a second voltage level;

determine the data associated with the set of signals is invalid based at least in part on a voltage of each signal of the set of signals being equivalent to the first voltage level for the first time period and a voltage of the signal being equivalent to the second voltage level for the second time period; and discard the data based at least in part on determining the data is invalid.

9. The host system of claim 8, wherein the circuitry is further configured to cause the host system to:

generate, based at least in part on the set of signals detected at the set of data pins, a first error correction code based at least in part on a set of data represented by the set of signals;

determine, based at least in part on the signal detected at the error correction information pin, a second error correction code; and compare the first error correction code with the second error correction code.

10. The host system of claim 9, wherein the circuitry is further configured to cause the host system to:

determine that the data associated with the set of signals is invalid based at least in part on the first error correction code being different than the second error correction code.

11. The host system of claim 9, wherein the circuitry is further configured to cause the host system to:

determine that a read operation associated with the command is invalid based at least in part on the first error correction code being different than the second error correction code, wherein the data associated with the set of signals is determined as invalid based on determining that the read operation is invalid.

12. The host system of claim 8, wherein the circuitry is further configured to cause the host system to:

enter a mode of operation associated with ignoring data received from the memory system based at least in part on determining that the data is invalid.

13. The host system of claim 8, wherein the voltage of the signal is equivalent to the second voltage level for the second time period based at least in part on a circuit that couples the error correction information pin with a voltage source.

14. The host system of claim 8, wherein the first time period and the second time period overlap.

15. A non-transitory, computer-readable medium storing code comprising instructions executable, individually or collectively, by one or more processors of a host system to cause the host system to:

transmit, to a memory system, a command associated with reading data stored at the memory system;

detect, based at least in part on transmitting the command and during a first time period associated with communicating data requested by the command, a set of signals at a set of data pins, wherein each signal of the set of signals comprises a first voltage level;

detect, based at least in part on transmitting the command and during a second time period associated with communicating error correction information for the data requested by the command, a signal at an error correction information pin associated with communicating the error correction information, wherein the signal comprises a second voltage level;

determine the data associated with the set of signals is invalid based at least in part on a voltage of each signal of the set of signals being equivalent to the first voltage level for the first time period and a voltage of the signal being equivalent to the second voltage level for the second time period; and discard the data based at least in part on determining the data is invalid.

16. The non-transitory, computer-readable medium of claim 15, wherein the instructions are further executable, individually or collectively, by the one or more processors to cause the host system to:

generate, based at least in part on the set of signals detected at the set of data pins, a first error correction code based at least in part on a set of data represented by the set of signals;

determine, based at least in part on the signal detected at the error correction information pin, a second error correction code; and compare the first error correction code with the second error correction code.

17. The non-transitory, computer-readable medium of claim 16, wherein the instructions are further executable, individually or collectively, by the one or more processors to cause the host system to:

determine that the data associated with the set of signals is invalid based at least in part on the first error correction code being different than the second error correction code.

18. The non-transitory, computer-readable medium of claim 16, wherein the instructions are further executable, individually or collectively, by the one or more processors to cause the host system to:

determine that a read operation associated with the command is invalid based at least in part on the first error correction code being different than the second error correction code, wherein the data associated with the set of signals is determined as invalid based on determining that the read operation is invalid.

19. The non-transitory, computer-readable medium of claim 15, wherein the instructions are further executable, individually or collectively, by the one or more processors to cause the host system to:

enter a mode of operation associated with ignoring data received from the memory system based at least in part on determining that the data is invalid.

20. The non-transitory, computer-readable medium of claim 15, wherein the voltage of the signal is equivalent to the second voltage level for the second time period based at least in part on a circuit that couples the error correction information pin with a voltage source.

* * * * *